United States Patent
Jiang et al.

(10) Patent No.: US 9,377,868 B2
(45) Date of Patent: Jun. 28, 2016

(54) SLIDING CONTROL METHOD AND TERMINAL DEVICE THEREOF

(71) Applicant: TENCENT TECHNOLOGY (SHENZHEN) COMPANY LIMITED, Guangdong (CN)

(72) Inventors: Ning Jiang, Guangdong (CN); Chen Zhou, Guangdong (CN); Zhongli Dong, Guandong (CN); Xi Wu, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/264,854

(22) Filed: Apr. 29, 2014

(65) Prior Publication Data

US 2014/0285455 A1 Sep. 25, 2014

Related U.S. Application Data

(63) Continuation of application No. PCT/CN2013/087344, filed on Nov. 18, 2013.

(30) Foreign Application Priority Data

Feb. 7, 2013 (CN) .......................... 2013 1 0049691

(51) Int. Cl.
*G06F 3/041* (2006.01)
*G06F 3/01* (2006.01)
*G06F 3/0488* (2013.01)
*G06F 3/0483* (2013.01)

(52) U.S. Cl.
CPC ................ *G06F 3/017* (2013.01); *G06F 3/041* (2013.01); *G06F 3/0483* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 2002/0033848 A1* | 3/2002 | Sciammarella et al. ...... | 345/838 |
| 2004/0212605 A1* | 10/2004 | Fitzmaurice et al. ......... | 345/184 |
| 2008/0155475 A1* | 6/2008 | Duhig ........................... | 715/830 |
| 2008/0288880 A1* | 11/2008 | Reponen et al. .............. | 715/764 |
| 2009/0015566 A1* | 1/2009 | Ausbeck, Jr. .................. | 345/174 |
| 2010/0083179 A1* | 4/2010 | Decker ................. | G06F 3/0483 715/830 |
| 2011/0138329 A1* | 6/2011 | Wells et al. ................... | 715/830 |
| 2012/0280922 A1* | 11/2012 | Lee et al. ...................... | 345/173 |

FOREIGN PATENT DOCUMENTS

| | | |
|---|---|---|
| CN | 102129321 | 7/2011 |
| JP | 2011-100253 | 5/2011 |

OTHER PUBLICATIONS

Notification of Transmittal of the International Search Report and the Written Opinion of the International Searching Authority dated Feb. 27, 2014, 12 pages.

* cited by examiner

*Primary Examiner* — Ilana Spar
*Assistant Examiner* — Kirk Hermann
(74) *Attorney, Agent, or Firm* — Foley & Lardner LLP

(57) ABSTRACT

The present disclosure discloses a sliding control method and the device thereof, falling into the field of human-computer interaction (HCI). The method comprises: displaying a slidable trajectory containing a current touch point; detecting a trigger signal being applied to the slidable trajectory; upon detection of the trigger signal, re-determining a current touch point; changing a corresponding first trajectory on the slidable trajectory to a second trajectory according to the re-determined current touch point; wherein, the first trajectory is entire or part of the slidable trajectory, the length of the second trajectory is longer than that of the first trajectory.

16 Claims, 14 Drawing Sheets

SLIDING CONTROL METHOD AND TERMINAL DEVICE THEREOF

CROSS REFERENCE TO RELATED APPLICATIONS

This application is a continuation of International Application No. PCT/CN2013/087344, filed on Nov. 18, 2013, which claims the benefit of priority to a Chinese Patent Application CN 201310049691X, titled "sliding control method and a device thereof" and filed in the Chinese Patent Office on Feb. 7, 2013, the entire content of which is hereby incorporated by reference.

FIELD OF INVENTION

The present disclosure relates to the field of human-computer interaction (HCI), and in particular, to a sliding control method and the terminal device thereof.

BACKGROUND

In recent years, terminal devices such as smart phones, tablet computers, electronic book reader or portable laptops and the like have been making increased use of peripheral equipments containing touch-sensitive surface to interact with users. A touch-sensitive surface comprises a touch display screen and a touch panel, and is generally used for the control of a user interface.

Page-turning control is one of the most frequently used interactive designs in user interface. As in many application programs, there is a situation where a plurality of pages are arranged sequentially side by side, with each page having its own number, all these pages cannot be displayed at the same time due to limit of the screen's size, so there is a need for a controlling means for selecting arbitrary page. The control or component for controlling such page selection is referred to as "page-turning control". Referring to FIG. 1A, which schematically shows a generally appearance of a page-turning control in the prior art. The page-turning control comprises a slidable trajectory formed by several touch points 12 arranged in straight line. The slidable trajectory may be of other forms, such as a continuous straight line as shown in FIG. 1B. Each touch point 12 corresponds to one page, a touch point 12a corresponding to the current page contains the current page indicated by a number; touch points 12b corresponding to the other pages are colored black. As a user's finger moves on the touch-sensitive surface along the slidable trajectory, a touch point 12 corresponding to the location of the user's finger would be re-determined as a new current touch point, and it would be switched to the page corresponding thereto as a new current page, thus meeting the purpose of user selecting arbitrary page for displaying or operating. Correspondingly, designs similar to a page-turning control include a progress bar in the forms of volume control interface, playing progress control interface etc.

In the process to implement the present disclosure, the inventor has found the following problems in the prior art: although touch screens of terminal devices such as smart phones or tablet computers etc. are inclined to be made bigger, the actual area for users' operation is still quite small, whereas the distance between two touch points in the page-turning control is generally only 3 to 5 pixels, so during the process when a user's finger operating on the page-turning control, mis-operations and inaccurate localizations happen very often. The occurrence of such problem will lead to the result that it takes the user more time to operate the page-turning control and consumes additional battery power. This will shorten the navigation time for a terminal device such as a smart phone or a tablet computer etc. which has limited battery power.

SUMMARY

In order to solve the problems mentioned above, such as frequent mis-operations and inaccurate localization during operations on page-turning control performed by user's finger, the embodiments of the prevent disclosure provides a sliding control method and the terminal device thereof. The technical solution is presented as follows:

According to an aspect, a sliding control method is provided, the method comprising:

displaying a slidable trajectory containing a current touch point;

detecting a trigger signal being applied to the slidable trajectory;

upon detection of the trigger signal, re-determining a current touch point;

changing a corresponding first trajectory on the slidable trajectory to a second trajectory according to the re-determined current touch point;

wherein, the first trajectory is entire or part of the slidable trajectory, the length of the second trajectory is longer than that of the first trajectory.

According to another aspect, a terminal device for performing sliding control method is provided, the terminal device comprising:

a touch display module, configured to display a slidable trajectory containing a current touch point;

a signal detecting module, configured to detect a trigger signal being applied to the slidable trajectory;

a touch determination module, configured to, upon detection of the trigger signal, re-determine a current touch point;

a trajectory changing module, configured to change a corresponding first trajectory on the slidable trajectory to a second trajectory according to the re-determined current touch point;

wherein, the first trajectory is entire or part of the slidable trajectory, the length of the second trajectory is longer than that of the first trajectory.

According to a further aspect, a computer programming product stored on computer readable medium is provided, comprising computer program code is provided, when loaded into a computer system and executed thereon, performs the above sliding control method.

According to a further aspect, a computer readable medium with computer programming product stored thereon is provided, the computer programming product comprising computer program code, when loaded into a computer system and executed thereon, performs the above sliding control method.

According to a further aspect, a sliding control method is provided, comprising:

displaying, on a screen, a slidable trajectory containing a highlighted current touch point;

detecting a trigger signal trigged by a touch or non-touch operation being applied to the slidable trajectory;

detecting an operation point on the screen corresponding to the trigger signal; and re-determining a current control point according to the operation point, and changing a corresponding first trajectory on the slidable trajectory to a second trajectory, and highlighting the re-determined current control point on the second trajectory, wherein, the first trajectory is entire or part of the slidable trajectory, the length of the second trajectory is longer than that of the first trajectory.

The advantageous effect brought by the technical solution of the embodiments of the present disclosure is as follows.

By changing a corresponding first trajectory on the slidable trajectory to a longer second trajectory upon detection of a trigger signal, it solves problem of frequent mis-operation or inaccurate localization during operations on a page-turning control by a user's finger; and achieves to provide a longer, bigger and wider space for the user to operate so the user can accomplish the sliding control operation in a quick manner, therefore would save battery power and extend the navigation capability of the terminal device.

BRIEF DESCRIPTION OF THE DRAWINGS

In order to explain the technical solutions in the embodiments of the present disclosure more clearly, the drawings to be used for descriptions of the embodiments will now be briefly introduced. It will be apparent that the drawings to be described below are only examples of some of the embodiments of the present disclosure, and an ordinary person skilled in the art may obtain other drawings on the basis of these ones without any inventive effort.

DETAILED DESCRIPTION

The technical solution and advantages of present disclosure will become more fully understood from the detailed description of the embodiments of the present disclosure given hereinafter with reference to the drawings.

Figure 1A:
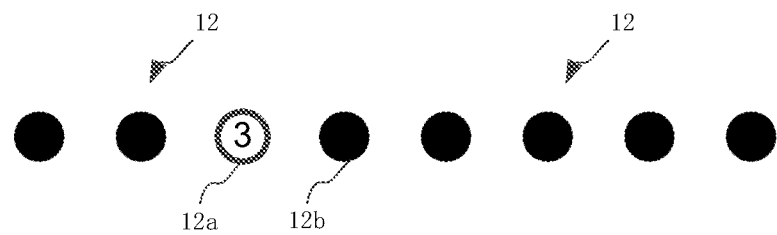
FIG. 1A is a schematic diagram showing the appearance of a slidable trajectory and current touch point in one page-turning control.
Figure 1B:
FIG. 1B is a schematic diagram showing the appearance of a slidable trajectory and current touch point in another page-turning control.
Figure 2:
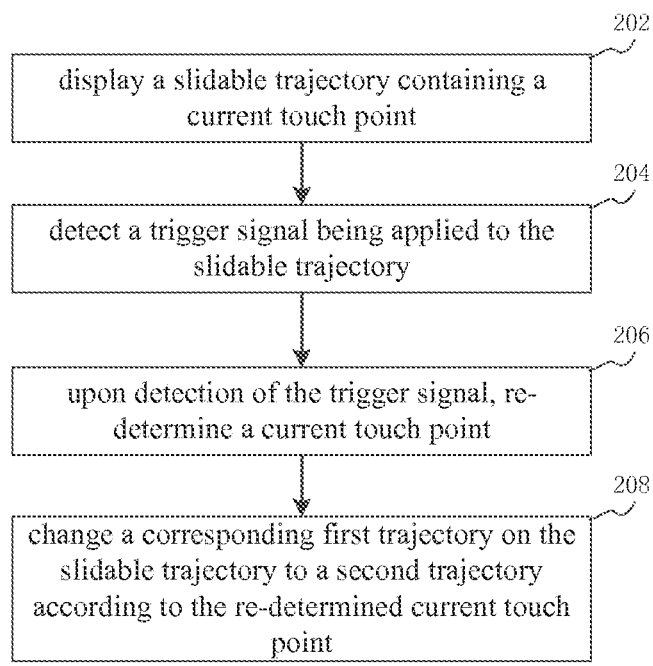
FIG. 2 is a flowchart of a sliding control method according to one embodiment of the present disclosure.

Refer to FIG. 2, which shows a flowchart of a sliding control method according to one embodiment of the present disclosure. This embodiment will mainly be explained exemplarily with reference to a terminal device comprising a touch screen or a touch panel, to which the sliding control method applies. The terminal device may be a smart phone, a tablet computer, an electronic book reader, a MP3 player (Moving Picture Experts Group Audio Layer III), MP4 (Moving Picture Experts Group Audio Layer IV) player, portable laptop computer and desktop computer etc. The sliding control method comprises the following steps.

At step 202, a slidable trajectory containing a current touch point is displayed.

In one example, the current touch point may be in the form of a point or other visual shape corresponding to the current page. For example, for a page where one enters an application at the first time, the current touch point may correspond to the first page of the application; or in other cases, for a page where one has quitted an application then enters it again, the current touch point may correspond to a page displayed the last time.

Figure 3A:
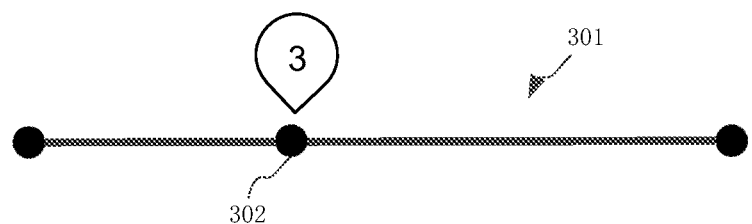
FIGS. 3A-3C are schematic diagrams showing the appearance of a slidable trajectory and current touch point according to the embodiment shown in FIG. 2.

Taking an example of a terminal device comprising a touch screen, the terminal device may display a slidable trajectory containing the current touch point on the touch screen. The current touch point may correspond to the current page, and the slidable trajectory may be indicated by several touch points or a straight line. A schematic diagram of the appearance of a slidable trajectory 301 and current touch point 302 indicated by a straight line is shown in FIG. 3A.

In one example, the current touch point on the slidable trajectory is highlighted, while the other touch points are darkened. In another example, a number corresponding to the current page is displayed on or around the current touch point, and numbers might be displayed or not displayed for other touch points.

At step 204, a trigger signal being applied to the slidable trajectory is detected.

The terminal device may detect on the touch screen a trigger signal being applied to the slidable trajectory, and the trigger signal may be a signal triggered by a touching operation that a user performs on the touch screen.

It should be noted that, the trigger signal is not limited to a signal triggered by a touching operation on the display screen. Indeed, the trigger signal may be a signal triggered by a non-touching operation. Taking as an example, in the circumstance where an infrared sensor or imaging device is used as a detecting device, the trigger signal can be one triggered by a certain action of hand or finger other than a touch action on the screen.

At step 206, upon detection of the trigger signal, a current touch point is re-determined according to the trigger signal.

Figure 3B:
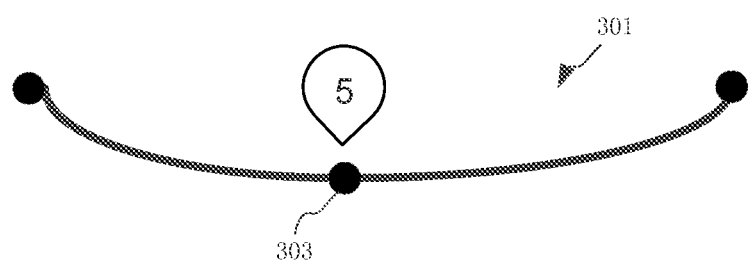

After a trigger signal is detected by the terminal device, the current touch point may be re-determined according to the trigger signal. For example, initially the current touch point corresponds to a page numbered 3, as shown in FIG. 3A; after a trigger signal is detected, another touch point may be re-determined on the slidable trajectory according to the triggering location of trigger signal on the touch screen, and the another current touch point corresponds to a page numbered 5, as shown in FIG. 3B.

It should be noted that, the re-determined current touch point may be one that is different from the previous current touch point, and may also be one that is same as the previous current touch point.

At step 208, a corresponding first trajectory on the slidable trajectory is changed to a second trajectory according to the re-determined current touch point.

Figure 3C:
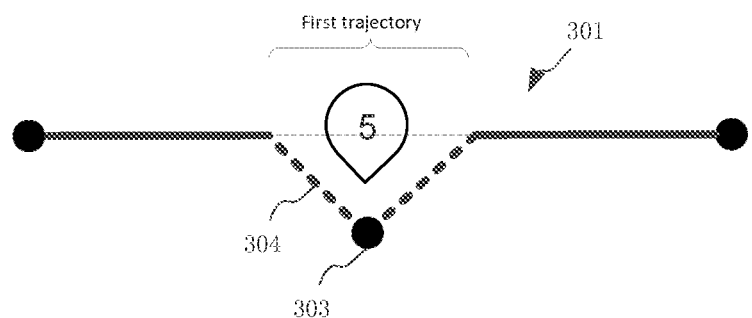

The terminal device may change a corresponding first trajectory on the slidable trajectory to a second trajectory according to the re-determined current touch point. This particularly applies to the situation where the location of the re-determined current touch point is not on the initially displayed slidable trajectory, but this also applies to the situation where the location of the re-determined current touch point is on the initially displayed slidable trajectory. The first trajectory may be entire of part of the slidable trajectory. The length of the second trajectory is longer than that of the first trajectory. The second trajectory can be a continuous or discontinuous trajectory of curved-line or folded-line appearance. As one example, where the first trajectory is the full trajectory on the slidable trajectory, the terminal device may change the slidable trajectory 301 from an initially straight-line segment to a curved line shaped, continuous second trajectory according to the re-determined current touch point 303, as shown in FIG. 3B. As another example, where the first trajectory is part of the slidable trajectory, the terminal device may change the slidable trajectory 301 from an initially straight-line segment to a folded line shaped, continuous second trajectory according to the re-determined current touch point 303, as shown in FIG. 3C. In FIG. 3C, the first trajectory is a segment of trajectory centered at the re-determined current touch point 303 and with a length of a pre-determined length. As the re-determined current touch point 303 changes, the first trajectory will change and correspondingly, the second trajectory will also change.

It should be noted that, after the first trajectory has changed to the second trajectory, distance between two adjacent touch points (only the current touch point is shown in this embodiment) will become bigger, thus enabling a more accurate operation of the user.

To sum up, the sliding control method according to this embodiment, upon detection of a trigger signal, changes a corresponding first trajectory on the slidable trajectory to a longer second trajectory, therefore solves the problem of frequent mis-operation or inaccurate localization during operations on a page-turning control by a user's finger; and achieves to provide a longer, bigger and wider space for the user to operate, so he or she can accomplish the sliding control operation in a quick and accurate manner, thus saving battery power and extending the navigation capability of the terminal device.

Figure 4:
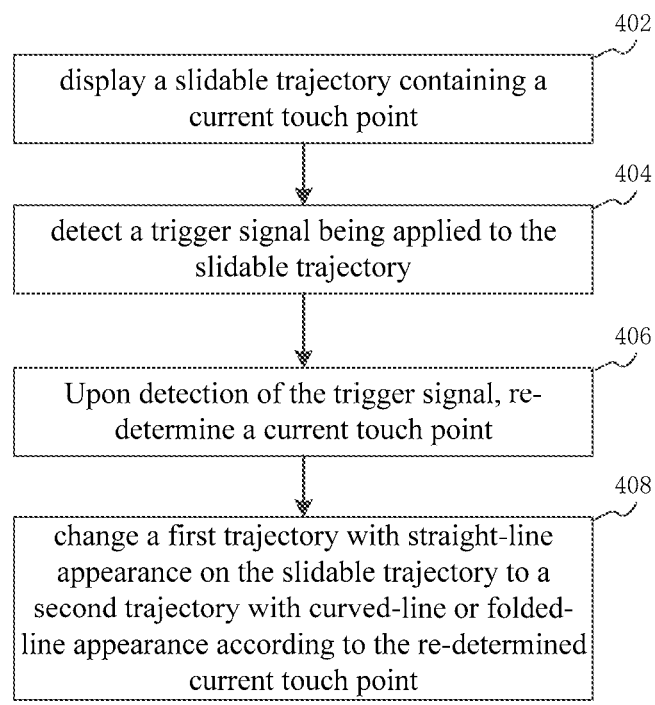
FIG. 4 is a flowchart of a sliding control method according to another embodiment of the present disclosure.

Referring to FIG. 4, which shows a flowchart of a sliding control method according to another embodiment of the present disclosure. Compared with the above embodiment, in order to describe in more details, this embodiment is mainly explained by taking the example of a terminal device containing a touch screen to which the sliding control method, while assuming the slidable trajectory contains several touch points and the first trajectory is the entire trajectory of the slidable trajectory. The sliding control method comprises the following steps.

At step 402, a slidable trajectory containing a current touch point is displayed.

Figure 5A:
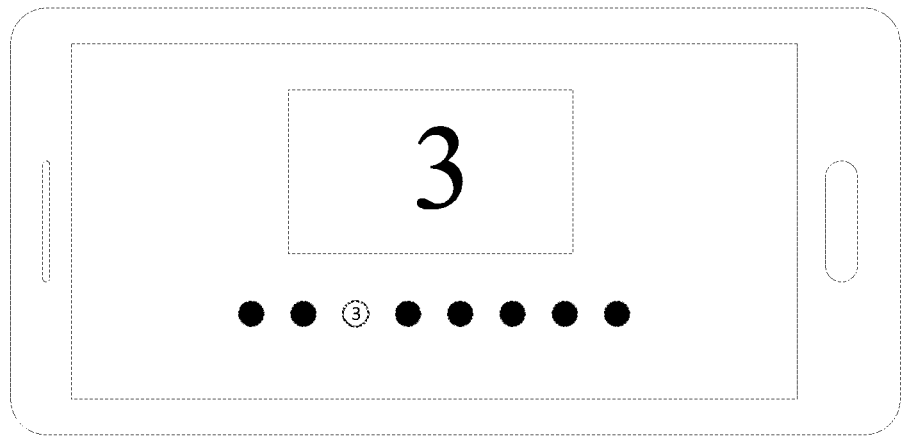
FIGS. 5A-5C are schematic diagrams showing the appearance of a slidable trajectory and current touch point according to the embodiment shown in FIG. 4.

The terminal device may display a slidable trajectory containing the current touch point on the touch screen. The current touch point may correspond to the current page, and the slidable trajectory in this embodiment may be indicated by several touch points. At this time, a schematic diagram of the appearance of a slidable trajectory and current touch point may be as shown in FIG. 5A. Assume that the current touch point at this time corresponds to the third page.

At step 404, a trigger signal being applied to the slidable trajectory is detected.

The terminal device may detect on the touch screen a trigger signal being applied to the slidable trajectory. The trigger signal may be a signal generated by the touching operation of user's finger performed at the location corresponding to the slidable trajectory on the touch screen. For example, if the user wants to select a page close to the middle of all pages, then the user's finger performs touching operation at the middle part of the slidable trajectory on the touch screen, thus generating a trigger signal.

At step 406, upon detection of the trigger signal, a current touch point is re-determined according to the trigger signal.

Figure 5B:
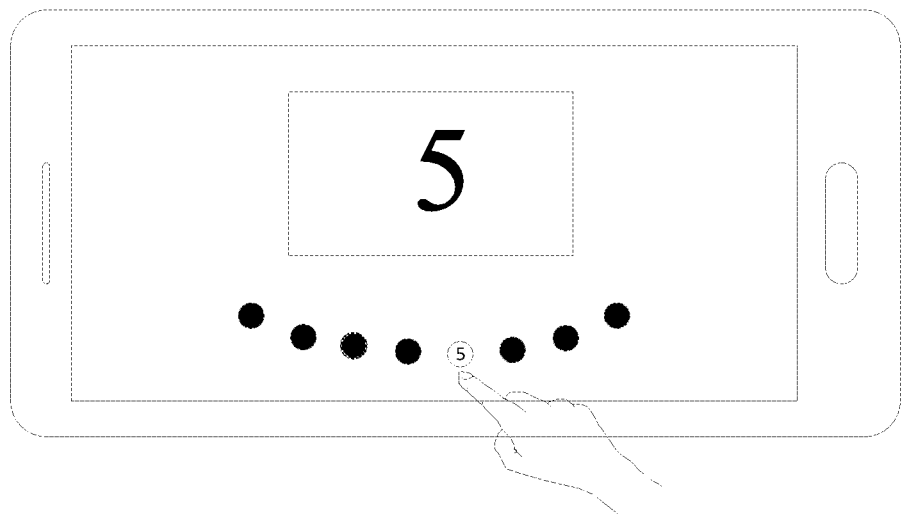

After a trigger signal is detected by the terminal device, the current touch point may be re-determined according to the trigger signal. For example, initially the current touch point corresponds to a page numbered 3, as shown in FIG. 5A. After a trigger signal is detected, another touch point may be re-determined on the slidable trajectory according to the triggering location of the trigger signal on the touch screen. In this example, the another current touch point corresponds to a page numbered 5, as shown in FIG. 5B.

It should be noted that this process may be performed more than one time, and may be performed at a pre-determined interval such as 0.1 second. When the trigger signal is one that is generated by sliding touch of a user's finger at the location of the slidable trajectory on the touch screen, the current touch point may be re-determined more than one time. For example, if the user's finger slide from left to right, then touch points corresponding to pages numbered 5, 6, 7 and 8 may be determined in turn as new current touch points.

At step 408, a corresponding first trajectory on the slidable trajectory is changed to a second trajectory according to the re-determined current touch point.

The terminal device may change a corresponding first trajectory on the slidable trajectory to a second trajectory according to the re-determined current touch point. The length of the second trajectory is longer than that of the first trajectory. This particularly applies to the follows cases: where the location of the re-determined current touch point is not on the initially displayed slidable trajectory, but deviates from the initially displayed slidable trajectory with the operation of the user's finger purposely or not, e.g. the location of the re-determined current touch point being located below and close to the initially displayed slidable trajectory. Nevertheless, this also applies to the case where the location of the re-determined current touch point is on the initially displayed slidable trajectory. For example, in case that the location of the re-determined current touch point is on the initially displayed slidable trajectory, the terminal device may also change the slidable trajectory from an initially straight line segment to a curved line shaped slidable trajectory according to the re-determined current touch point 303, as shown in FIG. 5B.

Although the appearance of the initially displayed slidable trajectory may be presented in the form of wavy lines, slightly curved curves etc., in majority the initially displayed slidable trajectory is presented in continuous or incontinuous straight-line shape. If the initially displayed slidable trajectory is presented in straight-line shape, then the terminal device may change the first trajectory presented in straight-line shape on the slidable trajectory to a second trajectory presented in curved line shape or folded-line shape according to the re-determined current touch point. During this changing process, the terminal device may determine the shape of the second trajectory according to a predetermined function type, where the shape comprises curved-line shape or folded-line shape.

In one example, the exemplary method of deciding the shape of the second trajectory may specifically include four sub-steps as follows:

Firstly, the terminal device determines parameter values of a first pre-determined function according to the location of the re-determined current touch point and the location of a first end point of the first trajectory.

When the first trajectory is one with straight-line shape, it may have two end points. In this embodiment, one of the two end points may be referred to as "a first end point", and the other one of the two end points may be referred to as "a second end point".

Figure 5C:
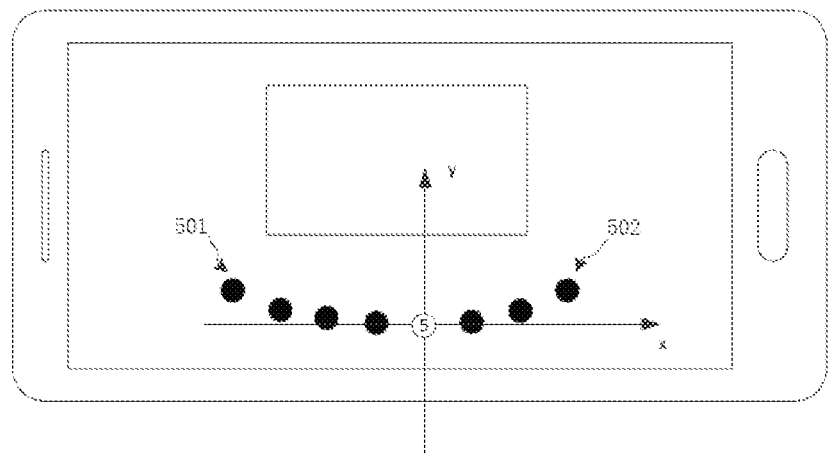

The terminal device may establish a Cartesian coordinates as shown in FIG. 5C with the location of the re-determined current touch point being the origin of the coordinate system, the direction of one edge of the rectangular touch screen being the x-axis, and the direction of another edge of the rectangular touch screen being the y-axis. Then, taking the location of the re-determined current touch point as a coordinate point, the location of the first end point 501 on the first trajectory as another coordinate point, parameter values of a first pre-determined function can be calculated based on these two coordinate points. The first pre-determined function may be any one of a linear function $y=\pm kx$, a parabola function $y=\pm ax2$, an n-th power function $y=\pm ax^n$ (n is an integer larger or equal to 3), index function $y=\pm k(a^x-1)$, sinusoidal function $y=\pm a \sin x$, cosine function $y=\pm a \cos x$ and tangential function $y=\pm a \tan x$.

Figure 5D:
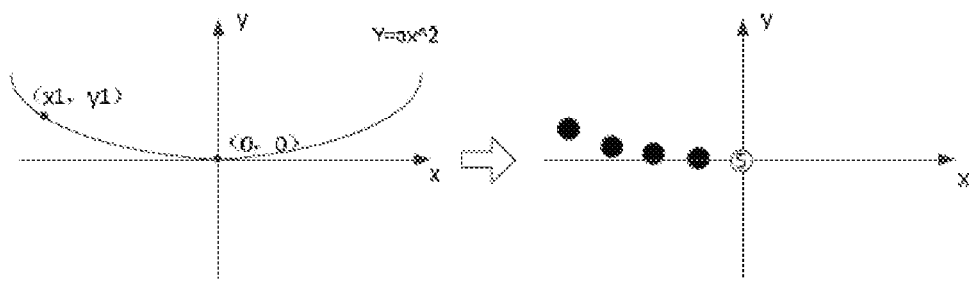
FIG. 5D is a schematic diagram showing an implementation of a first pre-determined function forming one portion of a second trajectory according to the embodiment shown in FIG. 4.

Taking an example of parabola function $y=\pm ax^2$ being the function type of the first pre-determined function, after the coordinates system is established based on the location of the re-determined current touch point, the location of the re-determined current touch point is taken as one coordinate point (0,0), the first end point on the first trajectory is taken as another coordinate point (x1, y1), the two coordinates are substituted into the parabola function $y=ax^2$, so that the parameter a in the parabola function $y=ax^2$ may be determined, as shown in FIG. 5D.

Secondly, a portion of the second trajectory between the re-determined current touch point and the first end point is determined according to the first pre-determined function.

After the terminal device has determined the parameter values of the first pre-determined function, the function curve of the first pre-determined function in the Cartesian coordinates is completely determined. At this time, the terminal device may determine a portion of the second trajectory between the re-determined current touch point and the first end point according to the function curve of the first pre-determined function, as shown in FIG. 5D. At this point, the portion of trajectory that is to the left of the current touch point within the second trajectory may be determined.

Thirdly, parameter values of a second pre-determined function are determined according to the location of the re-determined current touch point and the location of a second end point of the first trajectory.

Similar to the first and second sub-steps, the terminal device may also determine parameter values of a second pre-determined function according to the location of the re-determined current touch point and the location of a second end point of the first trajectory. In specific, after a Cartesian coordinates is established, taking the location of the re-determined current touch point as a coordinate point, the location of the second end point 502 on the first trajectory as another coordinate point, parameter values of a second pre-determined function can be calculated based on these two coordinate points. The second pre-determined function may be any one of a linear function $y=\pm kx$, a parabola function $y=\pm ax2$, an n-th power function $y=\pm ax^n$ (n is an integer larger or equal to 3), index function $y=\pm k(a^x-1)$, sinusoidal function $y=\pm a \sin x$, cosine function $y=\pm a \cos x$ and tangential function $y=\pm a \tan x$. The function type of the second function may generally be the same as that of the first function, but may also be different.

Figure 5E:
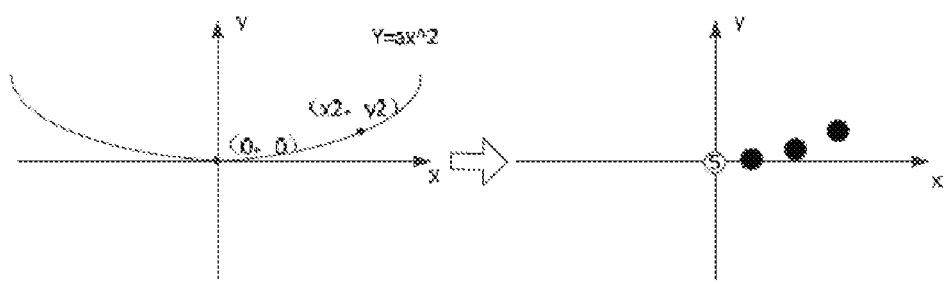
FIG. 5E is a schematic diagram showing an implementation of a second pre-determined function forming another portion of a second trajectory according to the embodiment shown in FIG. 4.

Still taking an example of parabola function $y=\pm ax^2$ being the function type of the second pre-determined function, after the coordinates system is established based on the location of the re-determined current touch point, the location of the re-determined current touch point is taken as one coordinate point (0,0), the second end point on the first trajectory is taken as another coordinate point (x2, y2), and the two coordinates are substituted into the parabola function $y=ax^2$, so that the parameter a in the parabola function $y=ax^2$ may be determined, as shown in FIG. 5E.

Fourthly, the other portion of the second trajectory between the re-determined current touch point and the second end point is determined according to the second pre-determined function.

After the terminal device has determined the parameter values of the second pre-determined function, the function curve of the second pre-determined function in the Cartesian coordinates is completely determined. At this time, the terminal device may determine the other portion of the second trajectory between the re-determined current touch point and the second end point according to the function curve of the second pre-determined function, as shown in FIG. 5E. At this point, the portion of trajectory that is to the right of the current touch point within the second trajectory may be determined. The third and the fourth sub-steps may occur before the first and second sub-steps.

Figure 5F:
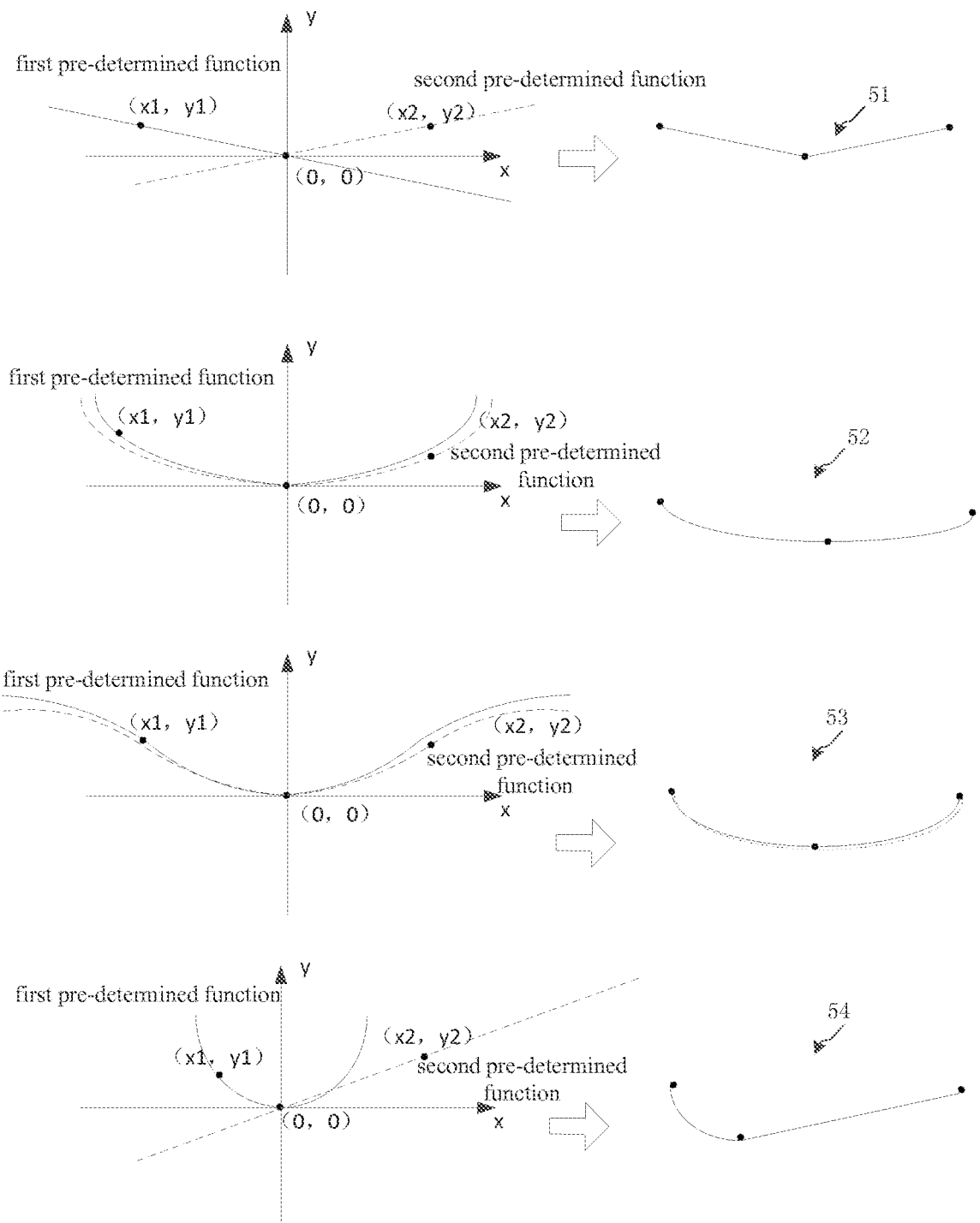
FIG. 5F is a schematic diagram showing the appearance of a second trajectory formed by the combination of a first pre-determined function and a second pre-determined function of different function types.

On one hand, the function type of the first pre-determined function and the function type of the second pre-determined function may be the same, or may be different. On the other hand, the function type of the first pre-determined function may be selected from a variety of function types, and the function type of the second pre-determined function may also be selected from a variety of function types. So different selections of the first and second pre-determined functions may implement different combinations. The different combinations of the first and second pre-determined function will then cause the second trajectory to have different effects. FIG. 5F shows in turn four kinds of second trajectory as the results of four different combinations.

When the first pre-determined function and the second pre-determined function are both linear functions, it will cause a folded-line shaped second trajectory 51 to be presented, and the second trajectory herein presents a relative tight "elastic" effect.

When the first pre-determined function and the second pre-determined function are both n-th power functions, it will cause a curved-line shaped second trajectory 52 with relatively small curvature to be presented, and the second trajectory herein presents a normal "elastic" effect.

When the first pre-determined function and the second pre-determined function are both sinusoidal or cosine functions, it will cause a curved-line shaped second trajectory 53 with relatively big curvature to be presented, and the second trajectory herein presents a relative loose "elastic" effect.

When the first pre-determined function is a parabola function and the second pre-determined function is a linear function, it will cause the second trajectory 54 to be half in curved-line and the other half in folded-line, and the second trajectory herein presents a one-end-stretched "elastic" effect.

The list can go on but the explanation thereto is omitted here. However, it should be noted that, in order to make the display of the second trajectory have more interactions with the trigger signal generated by the user's finger, the terminal device may selectively employ different function type combinations between the first and second pre-determined functions. Preferably, in one example, the method may comprises the following steps prior to the above first sub-step:

Firstly, a distance between the location of the re-determined current touch point and the first trajectory is obtained.

Figure 5G:
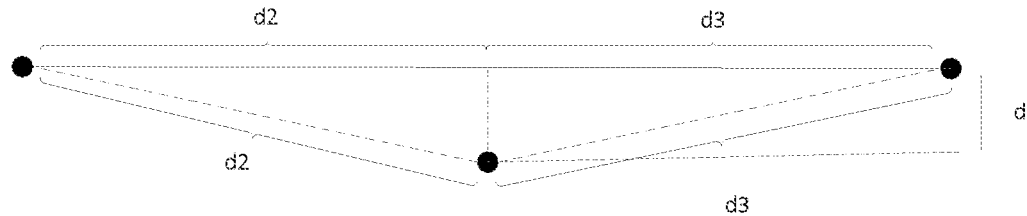
FIG. 5G is a schematic diagram showing the distance between a pre-determined current touch point and a first trajectory, and between a first end point of a first trajectory and between a second end point of a first trajectory.

When the first trajectory is presented in straight-line shape, the distance between the location of the re-determined current touch point and the first trajectory is a distance d between the current touch point and the straight-line of the first trajectory, as shown in FIG. 5G.

Second, a function type of the first pre-determined function and a function type of the second pre-determined function are selected according to the distance.

After the terminal device has obtained the distance d, the function type of the first and second pre-determined functions may be selected according to this distance.

In specific, the terminal device detects whether the distance d is smaller than a first threshold or larger than a second threshold, wherein the first threshold is smaller than the second threshold.

If it is detected that the distance d is smaller than the first threshold, then trigonometric function is selected as the function type of the first pre-determined function and/or the second pre-determined function. That is to say, when the distance d is relatively small, a loose "elastic" effect will be presented.

If it is detected that the distance d is larger than the second threshold, then linear function is selected as the function type of the first pre-determined function and/or the second pre-determined function. That is to say, when the distance d is relatively big, a tight "elastic" effect will be presented;

If it is detected that the distance d is larger than the first threshold and smaller than the second threshold, then one of the parabola function, n-th power function and index function is selected as the function type of the first pre-determined function and/or the second pre-determined function. That is to say, when the distance d is moderate, a normal "elastic" effect will be presented.

More preferably, the terminal device may obtain a distance d2 between the location of the re-determined current touch point and the first end point of the first trajectory, then it may select a function type of the first pre-determined function based on distance d2, the distance d2 may be straight-line distance between two points, or projection distance on the x-axis of the two points, as shown in FIG. 5G; the terminal device may also obtain a distance d3 between the location of re-determined current touch point and the second end point of the first trajectory, then it may select the function type of the second pre-determined function based on distance d3, the distance d3 may be straight-line distance between two points, or projection distance on the x-axis of the two points, as shown in FIG. 5G.

Apparently, when the user's finger continuously performs sliding touch at the slidable trajectory on the touch screen, the terminal device needs to perform step 406 and step 408 repeatedly until the user manages to select t a desired page or progress.

To sum up, the sliding control method according to this embodiment solves the problem of frequent mis-operations and inaccurate localization during the process of user's finger operating on a page-turning control, by changing a corresponding first trajectory on the slidable trajectory to a second trajectory being longer than the first trajectory, and it achieves to provide a longer, larger and wider space for the user to operate, so that the user can quickly accomplish the sliding control operation, thus saving batter power and increasing the thus navigation capability of the terminal device. This embodiment also enhances the interactivity between the trigger signal generated by the user's finger and the second trajectory, and can increase the accuracy of the operation of the user's finger at the current touch point and the slidable trajectory.

Figure 6:
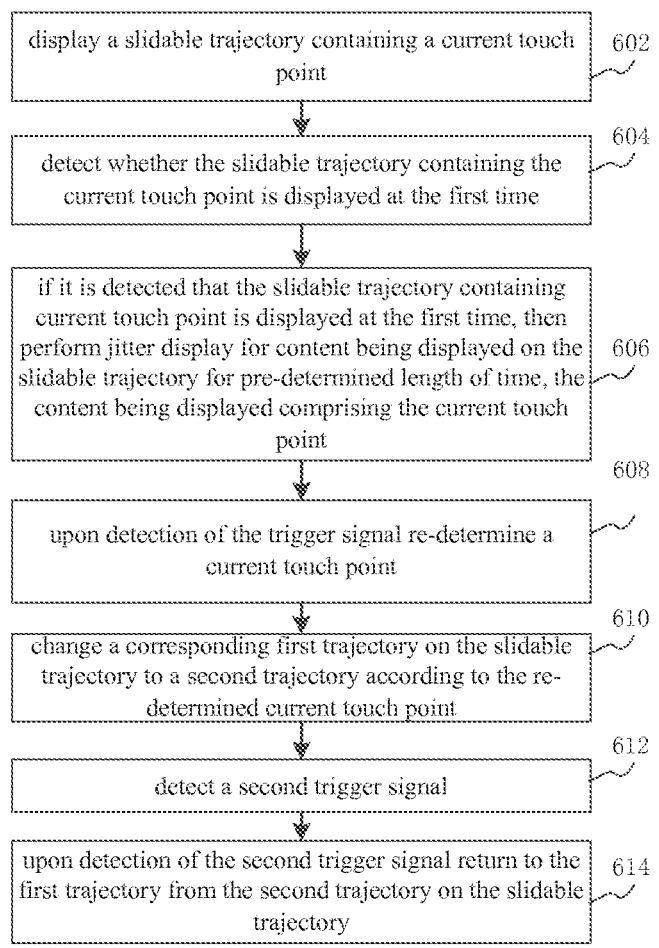
FIG. 6 is a flowchart of a sliding control method according to a further embodiment of the present disclosure.

Referring to FIG. 6, it shows a flowchart of a sliding control method according to another embodiment of the present disclosure. To illustrate more details and different aspects, compared with the previous embodiment, this embodiment also adds animation effect prior to the receipt of user's trigger signal and after the operation of user. The sliding control method comprises the following steps.

At step 602, a slidable trajectory containing a current touch point is displayed.

Figure 7A:
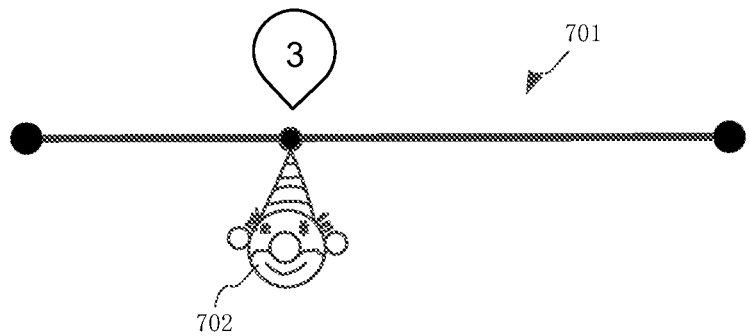
FIGS. 7A-7E are schematic diagrams showing the appearance of a slidable trajectory and current touch point according to the embodiment shown in FIG. 6.

The terminal device may display a slidable trajectory containing the current touch point on the touch screen. The current touch point may correspond to the current page, and the slidable trajectory in this embodiment may be indicated by a straight-line segment 701, the current touch point may be presented by a crown icon 702. That is, the appearance of the current point is not necessarily a point, but may also be a graph. In one example, a schematic diagram of the appearance of a slidable trajectory and current touch point may be as shown in FIG. 7A. Assume that the current touch point in this case corresponds to the third page.

At step 604, it is detected whether the slidable trajectory containing current touch point is displayed at the first time.

As a conventional slidable trajectory is a straight-lined segment, so the user might not know that the slidable trajectory can also be deformed beforehand. Therefore, after the slidable trajectory containing current touch point has been displayed at the first time, the terminal device may display a corresponding animation effect in order to inform or attract the user to operate the slidable trajectory. For this purpose, the terminal device might first detect whether the slidable trajectory containing current touch point is displayed at the first time.

At step 606, if it is detected that the slidable trajectory containing current touch point is displayed at the first time, then it is performed jitter display for content being displayed on the slidable trajectory for pre-determined length of time, the content being displayed comprising the current touch point.

Figure 7B:
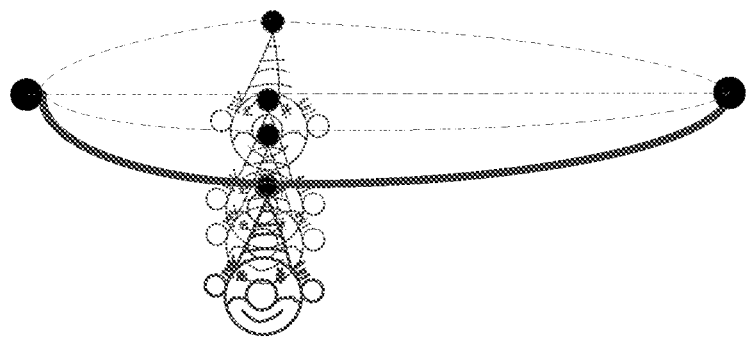

If it is detected that the slidable trajectory containing current touch point is displayed at the first time, then the terminal device may perform jitter display for content being displayed on the slidable trajectory for pre-determined length of time The content being displayed comprises the current touch point and may comprise other display content such as other touch points. The "jitter display" described herein may be jitter display of entire of part of deformed trajectory of the slidable trajectory, as shown in FIG. 7B. After having observed that the slidable trajectory can be deformed, the user might be led or attracted to touch the slidable trajectory and/or the current touch point At step 608, upon detection of the trigger signal, a current touch point is re-determined according to the trigger signal.

Figure 7C:
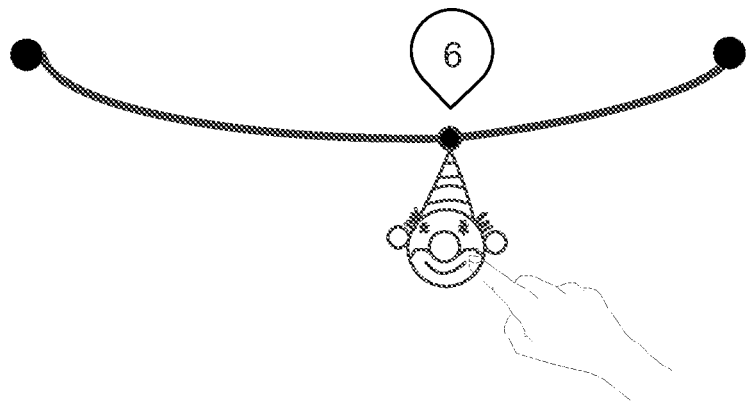

After a trigger signal is detected by the terminal device, the current touch point may be re-determined according to the trigger signal. For example, initially the current touch point corresponds to a page numbered 3, as shown in FIG. 7A. After a trigger signal is detected, another touch point may be re-determined on the slidable trajectory according to the triggering location of the trigger signal on the touch screen. In this example, the another current touch point corresponds to a page numbered 6, as shown in FIG. 7C.

It should be noted that this process may be performed more than one time, and may be performed at a pre-determined interval such as 0.2 second. When the trigger signal is one that is generated by sliding touch of a user's finger at the location of the slidable trajectory on the touch screen, the current touch point may be re-determined more than one time. For example, if the user's finger slide from left to right, then touch points corresponding to pages numbered 6, 7 and 8 may be determined in turn as new current touch points.

At step 610, a corresponding first trajectory on the slidable trajectory is changed to a second trajectory according to the re-determined current touch point The terminal device may change a corresponding first trajectory on the slidable trajectory to a second trajectory according to the re-determined current touch point. The length of the second trajectory is longer than that of the first trajectory. This particularly applies to the follows cases: where the location of the re-determined current touch point is not on the initially displayed slidable trajectory, but deviates from the initially displayed slidable trajectory with the operation of the user's finger purposely or not, e.g. the location of the re-determined current touch point being located below and close to the initially displayed slidable trajectory. Nevertheless, this also applies to the case where the location of the re-determined current touch point is on the initially displayed slidable trajectory. For example, the terminal device may change the slidable trajectory from an initially straight lined segment to a curved line shaped slidable trajectory according to the re-determined current touch point 303, as shown in FIG. 7C.

As an example, the second trajectory in this step is determined by the first and second pre-determined functions, and the type of which are both n-th power function. Specific determination process can be referred to the disclosed content in step 408 of the previous embodiment, and the repeated descriptions are omitted.

Apparently, when the user's finger continuously performs sliding touch at the slidable trajectory on the touch screen, the terminal device needs to perform step 608 and step 610 repeatedly until the user manages to select the desired page or desired progress.

At step 612, a second trigger signal is detected.

The terminal device may detect a second trigger signal, which is used to indicate that the user ceases or terminates operation on the slidable trajectory and the current touch point. If the trigger signal in step 608 is one generated when user's finger is sliding on the touch screen, then the second trigger signal may be one generated when user's finger is being removed from the touch screen.

At step 614, upon detection of the second trigger signal, it returns to the first trajectory from the second trajectory on the slidable trajectory.

If the terminal device has detected a second trigger signal, then it may return to the first trajectory from the second trajectory on the slidable trajectory. During this returning process, the terminal device may display an animation of returning to the first trajectory from the second trajectory. Specifically, in one example, the process of displaying animation may comprises the following two sub-steps:

First, the terminal device may perform pre-determined times of attenuated sinusoidal oscillation with the first trajectory being the axis of oscillation for content being displayed on the second trajectory, content being displayed on the second trajectory comprising the re-determined current touch point. Preferably, the first strategy is of a straight line form.

Figure 7D:
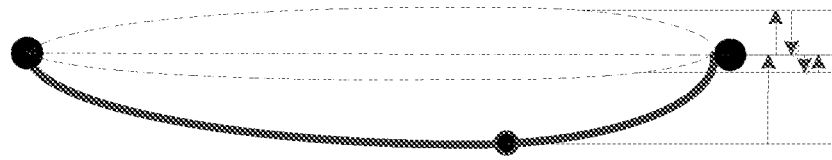

The terminal device may perform pre-determined times of attenuated sinusoidal oscillation with the first trajectory being the axis of oscillation for content being displayed on the second trajectory. Assuming the number of pre-determined times is five, and phase attenuation rate of the displayed content within every period of the attenuated sinusoidal oscillation is 50%, a simplified schematic diagram of the attenuated sinusoidal oscillation process is shown in FIG. 7D. Wherein, the movement from the peak/valley to the oscillation axis is taken as one oscillating process, the order of the five times of oscillation may be referred to the arrows shown from left to right in FIG. 7D. The period of an oscillation may be 0.2 s, 0.4 s or 0.6 s etc.

Secondly, after the last oscillation, it returns to the first trajectory from the second trajectory.

Figure 7E:
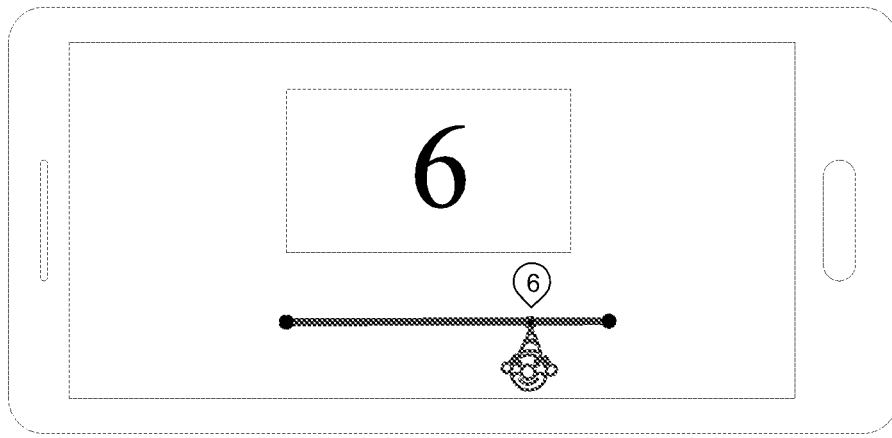

After pre-determined times of oscillation, the terminal device may return to the first trajectory from the second trajectory, as shown in FIG. 7E. At this time, if the slidable trajectory and the current touch point correspond to an application of page-turning control type, such as an electronic book reading application, the terminal device would need to display a page corresponding to the finally determined current touch point as the current page, as shown in FIG. 7E; if the slidable trajectory and the current touch pint correspond to an application of progress bar type, such as a music player application, then the terminal device would need to make the music playing progress skip to a playing time corresponding to the finally determined current touch point to play music.

It should be noted that, at step 604 when the slidable trajectory is jitter displayed, it may be displayed with the oscillation process similar to that is described in the first and second sub-steps of this step.

To sum up, the sliding control method according to this embodiment solves the problem of frequent mis-operations and inaccurate localization during the process of user's finger operating on a page-turning control, by changing a corresponding first trajectory on the slidable trajectory to a second trajectory being longer than the first trajectory, it achieves to provide a longer, larger and wider space for the user to operate, so that the user can quickly accomplish the sliding control operation, thus saving batter power and increasing the navigation capability of the terminal device. This embodiment also determines a presenting shape of the second trajectory by providing preset or instantly selected first and second pre-determined function, so as to enhance the interactivity between the trigger signal generated by the user's finger and the second trajectory, and can increase the accuracy of the operation of the user's finger at the current touch point and the slidable trajectory. This embodiment also adds corresponding animation effect before or after a user's operation, so as to guide the user to quickly, directly and accurately operate on the slidable trajectory and the current touch point, and further saves the time being spent on the sliding control operation, saves battery power and increases the navigation capability of the terminal device.

It should be noted that, although the above embodiments have been described with the example that first trajectory being the entire trajectory of the slidable trajectory and with some exemplary expressing forms of appearance of the slidable trajectory and the current touch point, the first trajectory may also be part of the slidable trajectory, e.g the first trajectory may be one centered at the current touch point with a length of a pre-determined length. The slidable trajectory and the current touch point may have other expressing form of appearance. For purpose of simplicity, it will be omitted here, and only the example that the first trajectory being part of the slidable trajectory will now be explained as follows.

Figure 7F:
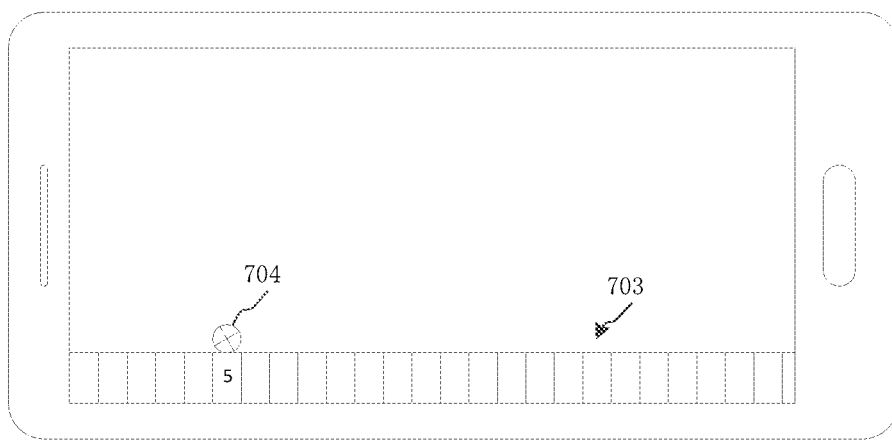
FIGS. 7F-7I are schematic diagrams showing the appearance of a slidable trajectory and current touch point according to another specific embodiment.
Figure 7G:
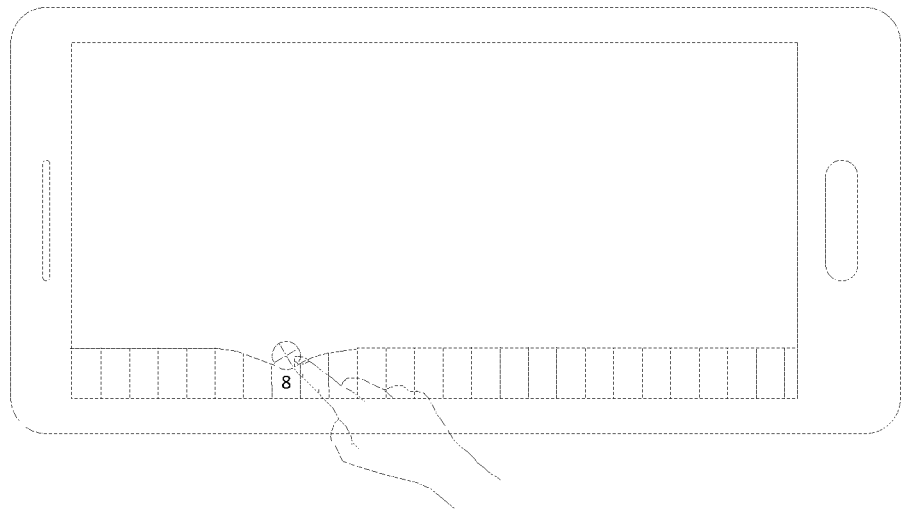
Figure 7H:
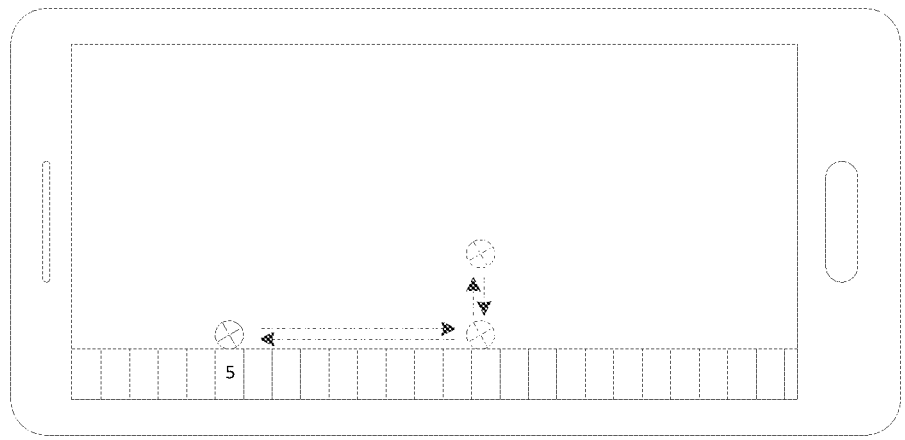
Figure 7I:
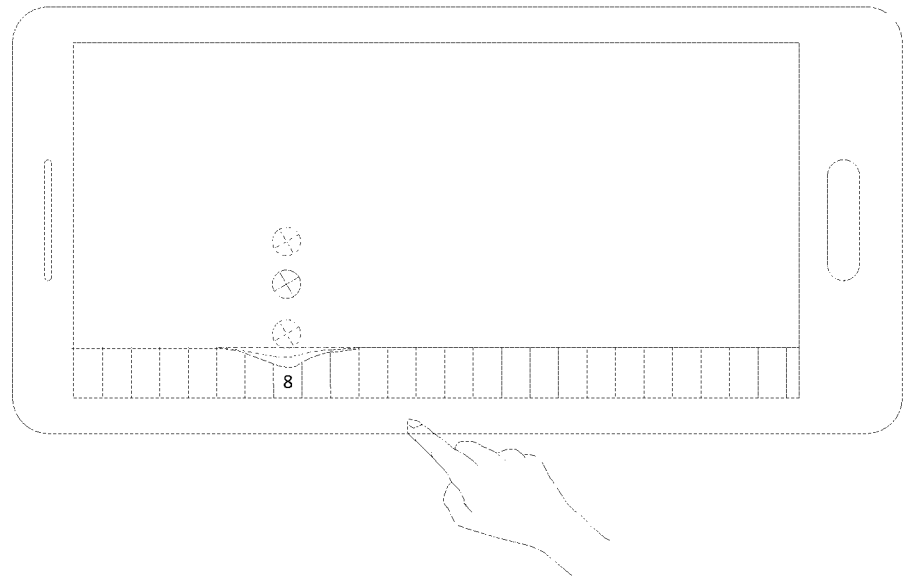

In the example shown in FIG. 7F, the slidable trajectory 703 is a trajectory of straight-line shape, and the current touch point 704 is a small ball being adjoined to the slidable trajectory 703. When the current touch point 704 is re-determined by a trigger signal, part of the trajectory on the slidable trajectory is deformed, as shown in FIG. 7G. In other words, a first trajectory is deformed to a second trajectory, allowing the user to slide the current touch point 704 in a bigger and longer space. The current first trajectory is centered at the current touch point with a pre-determined length, and can change continuously with the re-determination of the current touch point. Correspondingly, when the slidable trajectory 703 and the current touch point 704 is displayed at the first time, an animation of the current touch point 704 horizontally rolling and/or vertically bumping on the slidable trajectory may also be displayed, as shown in FIG. 7H. When the terminal device detects a second trigger signal, not only an attenuated oscillation process of a first trajectory of the slidable trajectory 704 may be displayed, but also the process showing the current touch point 704 popped out of the slidable trajectory 703 then fell back onto the slidable trajectory 703 may be displayed, as shown in FIG. 7I.

Below are explained the apparatus embodiments of the present disclosure, and the details which are not described thoroughly in those apparatus embodiments may be referred to above corresponding method embodiments.

Figure 8:
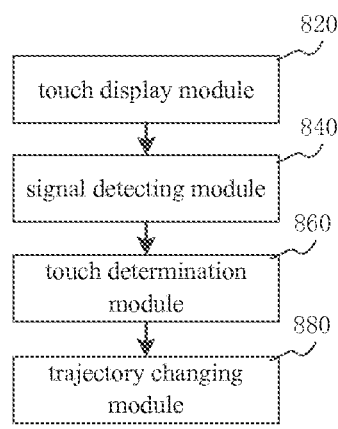
FIG. 8 is a block diagram for showing a configuration of a terminal device for performing the sliding control method according to one embodiment of the present disclosure.

Referring to FIG. 8, which shows a structural block diagram of a terminal device for performing the sliding control method according to one embodiment of the present disclosure. The terminal device comprises: a touch displaying module 820, a signal detecting module 840, a touch determination module 860 and a trajectory changing module 880.

The touch display module 820 is configured to display a slidable trajectory containing a current touch point.

The signal detecting module 840 is configured to detect a trigger signal being applied to the slidable trajectory displayed on the touch displaying module 820.

The touch determination module 860 is configured to, upon detection of the trigger signal by the signal detecting module 840, re-determine the current touch point.

The trajectory changing module 880 is configured to change a corresponding first trajectory on the slidable trajectory to a second trajectory according to the current touch point re-determined by the touch determination module 860.

The first trajectory is entire or part of the slidable trajectory, and the length of the second trajectory is longer than that of the first trajectory.

To sum up, the terminal device for performing the sliding control method according to this embodiment, upon detection of a trigger signal, changes a corresponding first trajectory on the slidable trajectory to a longer second trajectory, therefore solves the problem of frequent mis-operation or inaccurate localization during operations on a page-turning control by a user's finger; and achieves to provide a longer, bigger and wider space for the user to operate, so he or she can accomplish the sliding control operation in a quick manner, saving battery power and extending the navigation capability of the terminal device.

Figure 9:
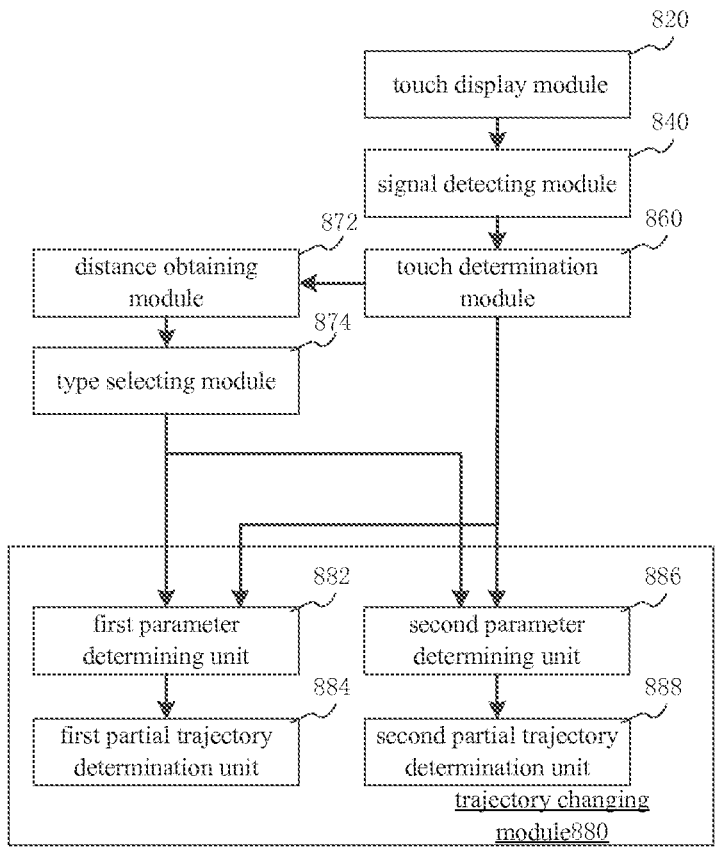
FIG. 9 is a block diagram for showing a configuration of a terminal device for performing the sliding control method according to another embodiment of the present disclosure.

Referring to FIG. 9, which shows a structural block diagram of a terminal device for performing the sliding control method according to another embodiment of the present disclosure. The terminal device shown in FIG. 9 has a structure different from that shown in FIG. 8 in the trajectory changing module 880, distance obtaining module 872 and type selecting module 874. In the following text, these differences will be focused while omitting descriptions to the touch displaying module 820, signal detecting module 840 and touch determination module 860 which are the same as those shown in FIG. 8.

The trajectory changing module 880 is configured to change a first trajectory with straight-line appearance on the slidable trajectory to a second trajectory with curved-line or folded-line appearance according to the current touch point re-determined by the touch determination module 860.

The trajectory changing module 880 comprises: a first parameter determining unit 882, a first partial trajectory determination unit 884, a second parameter determining unit 886 and a second partial trajectory determination unit 888.

The first parameter determining unit 882 is configured to determine parameter values of a first pre-determined function according to the location of the current touch point re-determined by the touch determination module 860 and the location of a first end point of the first trajectory.

The first partial trajectory determination unit 884 is configured to determine a portion of the second trajectory between the re-determined current touch point and the first end point according to the first pre-determined function determined by the first parameter determining unit 882.

The second parameter determining unit 886 is configured to determine parameter values of a second pre-determined function according to the location of the current touch point re-determined by the touch determination unit 860 and the location of a second end point of the first trajectory.

The second partial trajectory determination unit 888 is configured to determine the other portion of second trajectory between the re-determined current touch point and the second end point according to the second pre-determined function determined by the second parameter determining unit 886.

Each of the function type of the first pre-determined function and the second pre-determined function is any one chosen from the group of linear function, parabola function, n-th power function, index function and trigonometric function.

The distance obtaining module 872 is configured to obtain a distance between the location of the current touch point re-determined by the touch determination module 860 and the first trajectory.

The type selecting module 874 is configured to select function type of the first pre-determined function and the second pre-determined function according to the distance obtained by the distance obtaining module 872.

Figure 10:
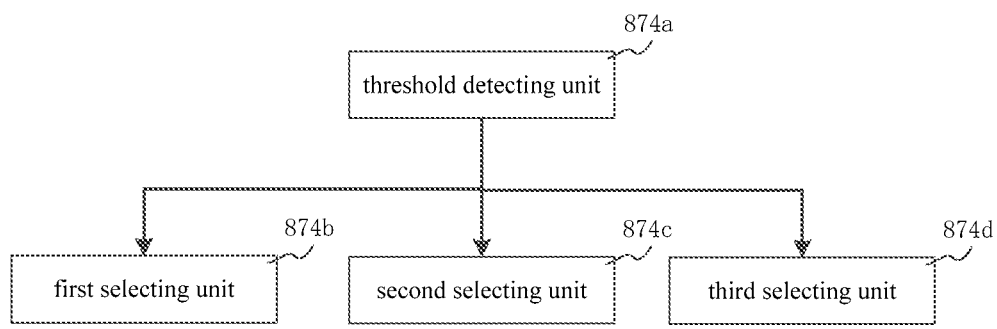
FIG. 10 is a block diagram for showing a configuration of the type selecting module according to the embodiment shown in FIG. 9.

Furthermore, the type selecting module 874 comprises: a threshold detecting unit 874a, a first selecting unit 874b, a second selecting unit 874c and a third selecting unit 874d, as shown in FIG. 10.

The threshold detecting unit 874a is configured to detect whether the distance obtained by the distance obtaining module 872 is smaller than a first threshold or larger than a second threshold, wherein the first threshold is smaller than the second threshold.

The first selecting unit 874b is configured to, when it is detected by the threshold detecting unit 874a that the distance is smaller than the first threshold, then select the trigonometric function as the function type of the first pre-determined function and/or the second pre-determined function.

The second selection unit 874c is configured to, when it is detected by the threshold detecting unit 874b that the distance is larger than the second threshold, then select the linear function as the function type of the first pre-determined function and/or the second pre-determined function.

The third selecting unit 874d is configured to, when it is detected by the threshold detection unit 874c that the distance is larger than the first threshold and smaller than the second threshold, then select one of parabola function, n-th power function and index function as the function type of the first pre-determined function and/or the second pre-determined function.

To sum up, the terminal device for performing the sliding control method according to this embodiment, upon detection of a trigger signal, changes a corresponding first trajectory on the slidable trajectory to a longer second trajectory, therefore solves the problem of frequent mis-operation or inaccurate localization during operations on a page-turning control by a user's finger; and achieves to provide a longer, bigger and wider space for the user to operate, so he or she can accomplish the sliding control operation in a quick manner, thus saving battery power and extending the navigation capability of the terminal device. This embodiment also determines a presenting shape of the second trajectory by providing preset or instantly selected first and second pre-determined function, so as to enhance the interactivity between the trigger signal generated by the user's finger and the second trajectory, and can therefore increase the accuracy of the operation of the user's finger at the current touch point and the slidable trajectory.

Figure 11:
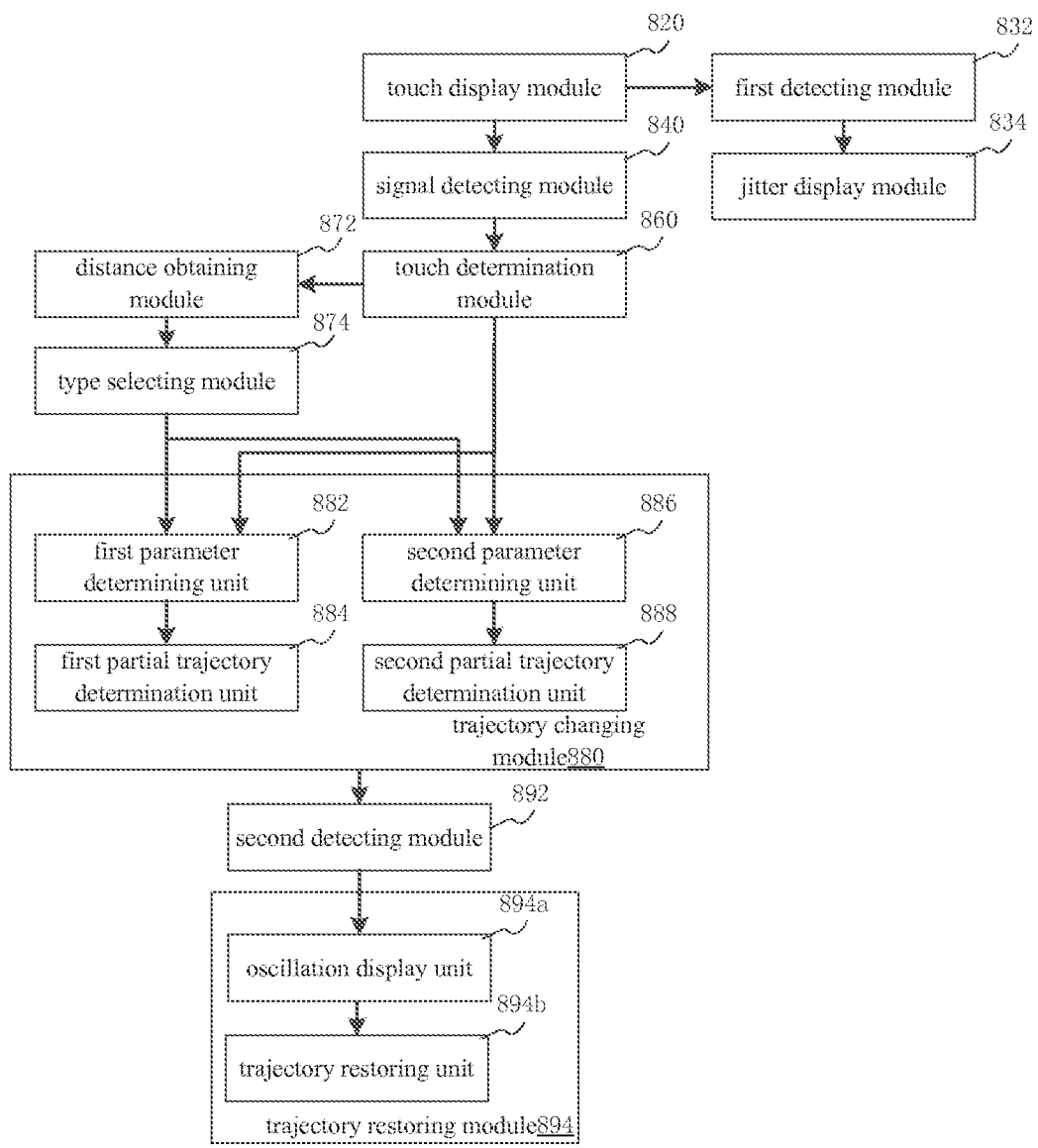
FIG. 11 is a block diagram for showing a configuration of a terminal device for performing the sliding control method according to a further embodiment of the present disclosure.

Referring to FIG. 11, which shows a structural block diagram of a terminal device for performing the sliding control method according to a further embodiment of the present disclosure. The terminal device shown in FIG. 11 has a structure different from that shown in FIG. 9 in that it also includes a first detecting module 832, a jitter display module 834, a second detecting module 892 and a trajectory restoring module 894 including an oscillation display unit 894a and trajectory restoring unit 894b. The following descriptions are focused on such different components, while omitting descriptions to the components that are the same as those shown in FIG. 9, that is, touch displaying module 820, signal detecting module 840, touch determination module 860, trajectory changing module 880 including first parameter determining unit 882, second parameter determining unit 886, first partial trajectory determination unit 884 and second partial trajectory determination unit 888; distance obtaining unit 872 as well as type selecting module 874.

The second detecting module 892 is configured to detect a second trigger signal.

The trajectory restoring module 894 is configured to, upon detection of the second trigger signal by the second detection module 892, make the slidable trajectory return to the first trajectory from the second trajectory.

The trajectory restoring module 894 comprises: an oscillation displaying unit 894a and a trajectory restoring unit 894b. Preferably, the first trajectory is presented in straight-line segment.

The oscillation displaying unit 894a is configured to perform pre-determined times of attenuated sinusoidal oscillation with the first trajectory being the axis of oscillation for content being displayed on the second trajectory, the content being displayed on the second trajectory comprising the re-determined current touch point.

The trajectory restoring unit 894b is configured to, after the last oscillation, make the slidable trajectory return to the first trajectory from the second trajectory.

As a preferred parameter, the pre-determined times is five, and the phase attenuation rate of the displayed content within every period of the attenuated sinusoidal oscillation is 50%.

As described above, the terminal device may further comprise a first detecting module 832 and a jitter display module 834.

The first detecting module 832 is configured to detect whether the slidable trajectory containing current touch point is displayed at the first time.

The jitter display module 834 is configured to, when it is detected by the first detecting module 832 that the slidable trajectory containing current touch point is displayed at the first time, then perform jitter display for content being displayed on the slidable trajectory for pre-determined length of time, the content being displayed comprising the current touch point.

To sum up, the terminal device for performing sliding control method according to this embodiment solves the problem of frequent mis-operations and inaccurate localization during the process of user's finger operating on a page-turning control, by changing a corresponding first trajectory on the slidable trajectory to a second trajectory being longer than the first trajectory, it achieves to provide a longer, larger and wider space for the user to operate, so that the user can quickly accomplish the sliding control operation, thus saving batter power and increasing the navigation capability of the terminal device. This embodiment also determines a presenting shape of the second trajectory by providing preset or instantly selected first and second pre-determined function, so as to enhance the interactivity between the trigger signal generated by the user's finger and the second trajectory, and can therefore increase the accuracy of the operation of the user's finger at the current touch point and the slidable trajectory. This embodiment also adds corresponding animation effect before or after a user's operation, so as to guide the user to operate on the slidable trajectory and the current touch point in quick, direct and accurate manner, and further saves the time being spent on the sliding control operation, saves battery power and increases the navigation capability of the terminal device.

It should be noted that, for the terminal device performing the sliding control according to the above mentioned embodiments, during its sliding control over the slidable trajectory, the explanation is given only with respect to the above assignment of various function modules, and in practice, the above mentioned functions might be assigned to different function modules according to the requirements, i.e. the internal structure of the device may be divided into different function modules to implement all or part of the above-mentioned functions. In addition, the terminal device for performing the sliding control method according to the above mentioned embodiments and the embodiments of the sliding control method belong to the same concept, the specific implementation of the terminal device can be referred to the method embodiments, and will not be repeated here.

Figure 12:
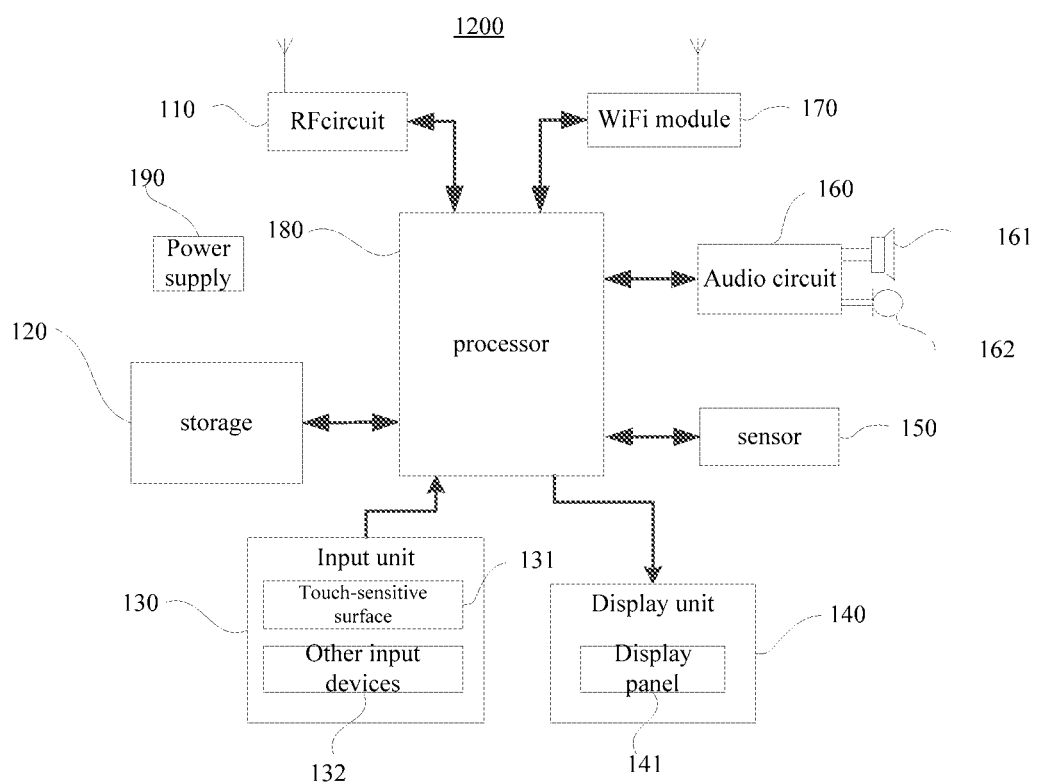
FIG. 12 is a schematic diagram for showing a configuration of a terminal device according to an embodiment of the present disclosure.

Refer to FIG. 12, which shows a schematic diagram of the structure of the terminal device having a touch-sensitive surface in relation to the embodiments of the present disclosure, the terminal device may be used to implement the sliding control method according to the above-described embodiments. In particular:

The terminal device 1200 may comprise the follow components: a RF (Radio Frequency) circuit 110, a storage or memory 120 including one or more computer readable medium, an input unit 130, a display unit 140, a sensor 150, an audio circuit 160, a WiFi (wireless fidelity) module 170, a processor 180 including one or more processing cores and a power 190 etc. A person skilled in the art should understand that, the terminal device is not limited to the terminal device structure shown in FIG. 11, and may comprise more or less components than those having been shown, or may combine some components or arrangements of different components.

The RF circuit may be used to receive and send information or during a call to receive and send signals, and in particular to pass the received downlink information from a base station to be processed by one or more processors; and send data related to uplink to the base station. Generally, the RF circuit 110 includes but is not limited to antenna, at least one amplifier, a tuner, one or more oscillations, a user identification module (SIM) card, a transceiver, a coupler, a LNA (Low Noise Amplifier) and a duplexer etc. Further, the RF may communicate with a network and other devices via wireless communication. The wireless communication may use any universal communication standard or protocol, includes but is not limited to GSM (Global System of Mobile Communication), GPRS (General Packet Radio Service), CDMA (Code Division Multiple Access), WCDMA (Wideband Code Division Multiple Access), LTE (Long Term Evolution), email, SMS (Short Messaging Service) etc.

The storage 120 may be used to store a software program and module. The processor 180 performs various functional application and data processing by running softwares and modules stored on the storage 120. The storage 120 may mainly comprise a software storage area and a data storage area, wherein, the software storage area may store operating system, an application software required by at least one function (e.g. sound playing function, image reproducing function etc.) and so on; the data storage area may store data (e.g. audio data, phonebook etc.) established according to the usage of the terminal device 1200. Further, the storage 120 may comprise a high speed random access storage, and may also comprise non-volatile storage, e.g. at least one disk storage component, flash disk component, or other volatile solid-state storage component. Correspondingly, the storage 120 may further comprise a storage controller, to provide the processor 180 and the input unit 130 access to the storage 120.

The input unit 130 may be used to receive input information of numerals and characters and generate keyboard, mouse, joy stick/action bar, optical or track ball signal input related to user settings and function control. In particular, the input unit 130 may comprise touch-sensitive surface 131 and other input devices 132. The touch-sensitive surface 131, also called a touch screen or touch panel, may collect the touch operation made by an user (e.g. the user's operation on the touch-sensitive surface 121 or adjacent thereto using finger, stylus or any proper objects or accessory), and drive corresponding connection means according a preset procedure. Alternatively, the touch-sensitive surface 131 may comprise two parts of a touch detecting means and a touch controller. The touch detecting means detects the touching location of the user, detects a signal as the result of the touch, and passes the signal to the touch controller. The touch controller receives touch information from the touch detecting means and converts it into touch point coordinates, then send the coordinates to the processor 180. The touch controller also can receive a command sent from the processor 180 and execute it. Further, the touch-sensitive surface 131 can be implemented by utilizing resistor type, capacitor type, infrared ray and surface acoustic wave and many other types. In addition to the touch-sensitive surface 131, the input unit 130 may comprise other input device 132. In particular, other input device 132 may comprise but is not limited to one or more of physical keyboard, function button (e.g. volume control button, switch button etc.), track ball, mouse, joystick etc.

The display unit 140 may be used to display information input by the user or provided to the user, as well as various graphic user interfaces (GUIs) of the terminal device 1200. These GUIs may be comprised of graphs, texts, icons, video and any combination thereof. The display unit 140 may comprise a display panel 141, and optionally may use LCD (Liquid Crystal Display), OLED (Organic Light-Emitting Diode)) and the like to configure the display panel 141. Further, the touch-sensitive surface 131 may cover the display panel 141. When the touch-sensitive surface 131 detects a touch operation thereon or thereabout, it passes the operation to the processor 180 to determine the type of the touch event, then the processor 180 provide corresponding visual output on the display panel 141 according to the type of the touch event. Although in FIG. 11, input and output functions are implemented by the touch-sensitive surface 131 and the display panel 141 as two separate components, in certain embodiments, the touch-sensitive surface 131 and the display panel 141 can be integrated together to implement the input and output function.

The terminal device 1200 may further comprise at least one kind of sensor 150, such as optical sensor, motion sensor and other sensors. In particular, a light sensor may comprise ambient light sensor and proximity sensor, wherein the ambient light sensor may adjust the luminance of the display panel 141 according to brightness of the ambient light, the proximity sensor can shut off the display panel 141 and/or backlight when the terminal devices 1200 approaches an ear. As one kind of the motion sensor, a gravity sensor may detect an acceleration value in each direction (normally three-axis), and detect the value and direction of gravity when it is static, it may be used for applications recognizing a gesture of a mobile phone (such as horizontal/vertical screen mode switching, related games, magnetic meter gesture calibration), vibration recognition related function (such as pedometer, tap) etc. Other sensors can be deployed in the terminal device 1200 such as gyroscope, barometer, hygrometer, thermometer, infrared sensor, and descriptions thereof are omitted.

The audio interface between the user and the terminal device 1200 may be provided by an audio circuit 160, a speaker 161 and a microphone 162. The audio circuit 160 may transmit an electronic signal converted from received audio data to the speaker 161, to be converted by the speaker 161 to a sound signal which is then outputted. On the other hand, the microphone 162 may convert the collected sound signal into electronic signal to be received and converted into audio data by the audio circuit 160. The audio data is then processed by the processor 180 and sent to e.g. another terminal device via the RF circuit 110, or the audio data is outputted to storage 120 for further processing. The audio circuit 160 may also comprise an earplug hole to provide communications between an earphone and the terminal device 1200.

Wifi is a short-distance wireless transfer technology. The terminal device 1200 may aid the user in sending and receiving emails, browsing web pages and accessing streaming media etc. via the wifi module 170, and it provides for wireless broadband Internet access to the user. Although FIG. 11 shows a wifi module 170, it should be understood that it is not a necessary component of the terminal device 1200, and can certainly be omitted from the terminal device 1200 as necessary and without departing from the spirit of the present disclosure.

The processor 180 is the control centre of the terminal device 1200, and utilizes various interfaces and circuits or buses to interconnect various parts within the entire mobile phone, executes various functions and processes data by executing or performing software programs and/or modules stored in the storage 120 and invoking data stored in the storage 120, so as to collectively monitor the mobile phone. Alternatively, the processor 180 may include one or more processing cores. Preferably, the processor 180 may integrate an application processor and a modem processor therein, with the application processor mainly deals with the operating system, the user interface and application programs etc., and with the modem processor mainly deals with wireless communications. It should be understood that the above mentioned modem processor may not be integrated into the processor 180 either.

The terminal device 1200 also comprises a power supply 190 (e.g. a battery) that supplies power to various components. Preferably, the power supply may be logically connected to the processor 180 via a power supply management system, so as to implement the functions of charging management, discharging management and power consumption management through the power supply management system. The power supply 190 may also comprise one or more DC or AC power sources, re-charging system, power failure detecting circuit, power converter or inverter, power status indicator or any other component.

Although it is not shown, the terminal device 1200 may also comprise a camera, a blue-tooth module etc., which will not be explained here. Particularly in this embodiment, the display unit of the terminal device is a touch screen display, and the terminal device also comprises a storage, and one or more programs, wherein the one or more programs is stored in the storage, and the one or more programs implement the functions/actions specified in the flowcharts and/or blocks of block diagrams when they are executed by the above one or more processors.

As another aspect of the present disclosure, a further embodiment of the present disclosure further provides a computer readable storage medium. The computer readable storage medium may be a computer readable storage medium contained in the storage of the above embodiments, or may also be discrete and not assembled into the terminal device. The computer readable storage medium stores one or more programs, with the one or more programs implement the functions/actions specified in the flowcharts and/or blocks of block diagrams when they are executed by the above one or more processors.

As a further aspect of the present disclosure, a further embodiment of the present disclosure provides a graphic user interface, the graphic user interface being used on the terminal device, and the terminal device comprising a touch screen display, a storage and one or more processors for performing one or more programs. The graphic user interface may comprise:

a slidable trajectory containing a current touch point being displayed on the touch screen display;

Upon detection of the trigger signal, re-determining the current touch point according to the trigger signal;

Changing a corresponding first trajectory on the slidable trajectory to a second trajectory according to the re-determined current touch point;

Wherein, the first trajectory being entire or part of the slidable trajectory, the length of the second trajectory being longer than that of the first trajectory.

It should be understood that although this disclosure uses the terms "first" and "second" to describe each component, these components should not be limited to the terms. These terms are only used to distinguish the components. For example, a first trigger signal may also be referred to as a second trigger signal, while the second trigger signal may be referred to as the first trigger signal without departing from the scope of the present disclosure. The first trigger signal and the second trigger signal are two trigger signals, but they are not the same signal. It should also be understood that for the usage in the present disclosure, the singular form of "a", "an" and "the" is intended to include also the plural form, unless otherwise the context indicates the contrary situation. It should be further understood that, "and/or" used in this disclosure refers to any or all possible combination of one or more items listed associatedly.

The above embodiments of the disclosure are only for the purpose of describing and do not represent the advantage or disadvantage of the embodiments.

An ordinary person skilled in the art may understand all or part of the process to implement the above embodiments may be implemented by hardware, or by programs which instructs related hardware. Such programs may be stored in a computer readable storage medium, and the storage medium mentioned above may be read-only storage, disk or optical disk.

The above descriptions are merely presented for preferred embodiments of the present disclosure and are not intended to limit the present invention. Any variations, equivalent substitutions or modifications without departing from the spirit and principle of the present disclosure are contemplated to be included within the scope of the following claims.

What is claimed is:

1. A method of sliding control at a screen of a hand-held apparatus, comprising:

displaying, on the screen, a slidable trajectory containing a current touch point in connection with a control of an application in the hand-held apparatus;

detecting a trigger signal corresponding to a touch or non-touch operation being applied to the slidable trajectory on the screen;

upon detection of the trigger signal, re-determining the current touch point; and changing a corresponding first trajectory on the slidable trajectory to a second trajectory according to the re-determined current touch point and displaying the second trajectory on the screen;

wherein, the first trajectory is entire or part of the slidable trajectory, the length of the second trajectory is longer than that of the first trajectory, wherein touch points on the slidable trajectory correspond to a plurality of pages to be displayed respectively, wherein, the changing the corresponding first trajectory on the slidable trajectory to a second trajectory according to the re-determined current touch point comprising:

changing the first trajectory with straight-line appearance on the slidable trajectory to the second trajectory with curved-line or folded-line appearance according to the re-determined current touch point, wherein, the changing the first trajectory with straight-line appearance on the slidable trajectory to the second trajectory with curved-line or folded-line appearance according to the re-determined current touch point comprising:
   determining parameter values of a first pre-determined function according to a location of the re-determined current touch point and a location of a first end point of the first trajectory;
   determining a portion of the second trajectory between the re-determined current touch point and the first end point according to the first pre-determined function;
   determining parameter values of a second pre-determined function according to the location of the re-determined current touch point and a location of a second end point of the first trajectory; and
   determining an other portion of the second trajectory between the re-determined current touch point and the second end point according to the second pre-determined function;
   wherein, each of the function type of the first pre-determined function and the second pre-determined function is any one chosen from the group of linear function, parabola function, n-th power function, index function and trigonometric function.

2. The method according to claim 1, wherein, prior to the determining parameter values of the first pre-determined function according to the location of the re-determined current touch point and the location of the first end point of the first trajectory, the method further comprising:
   obtaining a distance between the location of the re-determined current touch point and the first trajectory; and
   selecting function type of the first pre-determined function and the second pre-determined function according to the distance.

3. The method according to claim 2, wherein, the selecting function type of the first pre-determined function and the second pre-determined function according to the distance comprising:
   detecting whether the distance is smaller than a first threshold or larger than a second threshold, wherein the first threshold is smaller than the second threshold;
   if it is detected that the distance is smaller than the first threshold, then selecting trigonometric function as the function type of the first pre-determined function and/or the second pre-determined function;
   if it is detected that the distance is larger than the second threshold, then selecting linear function as the function type of the first pre-determined function and/or the second pre-determined function;
   if it is detected that the distance is larger than the first threshold and smaller than the second threshold, then selecting one of parabola function, n-th power function and index function as the function type of the first pre-determined function and/or the second pre-determined function.

4. The method according to claim 1, wherein, after the changing the corresponding first trajectory on the slidable trajectory to the second trajectory according to the re-determined current touch point, the method further comprising:
   detecting a second trigger signal;
   upon detection of the second trigger signal, returning to the first trajectory from the second trajectory.

5. The method according to claim 4, wherein, the returning to the first trajectory from the second trajectory comprising:
   performing pre-determined times of attenuated sinusoidal oscillation with the first trajectory being an axis of oscillation for content being displayed on the second trajectory, the content being displayed on the second trajectory comprising the re-determined current touch point;
   after a last oscillation, returning to the first trajectory from the second trajectory.

6. The method according to claim 5, wherein, the pre-determined times is five, and phase attenuation rate of the displayed content within every period of the attenuated sinusoidal oscillation is 50%.

7. The method according to claim 1, wherein, after the displaying the slidable trajectory containing the current touch point and prior to the detecting the trigger signal being applied to the slidable trajectory, the method further comprising:
   detecting whether the slidable trajectory containing current touch point is displayed at a first time;
   if it is detected that the slidable trajectory containing current touch point is displayed at the first time, then performing jitter display for content being displayed on the slidable trajectory for pre-determined length of time, the content being displayed comprising the current touch point.

8. The method according to claim 1, wherein, the re-determined current control point is on the second trajectory.

9. A terminal device, comprising:
   a screen;
   one or more processors;
   memory; and
   one or more modules stored in the memory and to be executed by the one or more processors, the one or more modules including:
   a touch display module, configured to display on the screen a slidable trajectory containing a current touch point in connection with a control of an application in the terminal device;
   a signal detecting module, configured to detect a trigger signal corresponding to a touch or non-touch operation being applied to the slidable trajectory on the screen;
   a touch determination module, configured to, upon detection of the trigger signal, re-determine the current touch point;
   a trajectory changing module, configured to change a corresponding first trajectory on the slidable trajectory to a second trajectory according to the re-determined current touch point and displaying the second trajectory on the screen;
   wherein, the first trajectory is entire or part of the slidable trajectory, the length of the second trajectory is longer than that of the first trajectory,
   wherein touch points on the slidable trajectory correspond to a plurality of pages to be displayed respectively,
   wherein, the trajectory changing module is configured to change the first trajectory with straight-line appearance on the slidable trajectory to the second trajectory with curved-line or folded-line appearance according to the re-determined current touch point,
   wherein, the trajectory changing module comprising:
   a first parameter determining unit, a first partial trajectory determination unit, a second parameter determining unit and a second partial trajectory determination unit;
   the first parameter determining unit is configured to determine parameter values of a first pre-determined function according to a location of the current touch point re-determined by the touch determination module and a location of a first end point of the first trajectory;
   the first partial trajectory determination unit is configured to determine a portion of the second trajectory between the re-determined current touch point and the first end point according to the first pre-determined function determined by the first parameter determining unit;

the second parameter determining unit is configured to determine parameter values of a second pre-determined function according to the location of the current touch point re-determined by the touch determination unit and a location of a second end point of the first trajectory; and the second partial trajectory determination unit is configured to determine an other portion of second trajectory between the re-determined current touch point and the second end point according to the second pre-determined function determined by the second parameter determining unit;

wherein, each of the function type of the first pre-determined function and the second pre-determined function is any one chosen from the group of linear function, parabola function, n-th power function, index function and trigonometric function.

10. The terminal device according to claim 9, wherein, the terminal device further comprising: a distance obtaining module and a type selecting module;

the distance obtaining module is configured to obtain a distance between the location of the current touch point re-determined by the touch determination module and the first trajectory;

the type selecting module is configured to select function type of the first pre-determined function and the second pre-determined function according to the distance obtained by the distance obtaining module.

11. The terminal device according to claim 10, wherein, the type selecting module comprising:

a threshold detecting unit, a first selecting unit, a second selecting unit and a third selecting unit;

the threshold detecting unit is configured to detect whether the distance obtained by the distance obtaining module is smaller than a first threshold or larger than a second threshold, wherein the first threshold is smaller than the second threshold;

the first selecting unit is configured to, when it is detected by the threshold detecting unit that the distance is smaller than the first threshold, then selecting trigonometric function as the function type of the first pre-determined function and/or the second pre-determined function;

the second selection unit is configured to, when it is detected by the threshold detecting unit that the distance is larger than the second threshold, then selecting linear function as the function type of the first pre-determined function and/or the second pre-determined function;

the third selecting unit is configured to, when it is detected by the threshold detection unit that the distance is larger than the first threshold and smaller than the second threshold, then selecting one of parabola function, n-th power function and index function as the function type of the first pre-determined function and/or the second pre-determined function.

12. The terminal device according to claim 9, wherein, the terminal device further comprising: a second detecting module and a trajectory restoring module;

the second detecting module is configured to detect a second trigger signal;

the trajectory restoring module is configured to, upon detection of the second trigger signal by the second detection module, make the slidable trajectory returning to the first trajectory from the second trajectory.

13. The terminal device according to claim 12, wherein, the trajectory restoring module comprising: an oscillation displaying unit and a trajectory restoring unit;

the oscillation displaying unit is configured to perform pre-determined times of attenuated sinusoidal oscillation with the first trajectory being the axis of oscillation for content being displayed on the second trajectory, the content being displayed on the second trajectory comprising the re-determined current touch point;

the trajectory restoring unit is configured to, after a last oscillation, return to the first trajectory from the second trajectory.

14. The terminal device according to claim 13, wherein, the pre-determined times is five, and the phase attenuation rate of the displayed content within every period of the attenuated sinusoidal oscillation is 50%.

15. The terminal device according to claim 9, wherein, the terminal device further comprising a first detecting module and a jitter display module;

the first detecting module is configured to detect whether the slidable trajectory containing current touch point is displayed at a first time;

the jitter display module is configured to, when the first detecting module detected that the slidable trajectory containing current touch point is displayed at the first time, then perform jitter display for content being displayed on the slidable trajectory for pre-determined length of time, the content being displayed comprising the current touch point.

16. A non-transitory computer readable medium with computer programming product stored thereon, the computer programming product comprising computer program code, when loaded into a computer system and executed thereon, performs a method of sliding control at a screen of the computer system, comprising:

displaying, on the screen, a slidable trajectory containing a current touch point in connection with a control of an application in a hand-held apparatus;

detecting a trigger signal corresponding to a touch or non-touch operation being applied to the slidable trajectory on the screen;

upon detection of the trigger signal, re-determining a current touch point; and changing a corresponding first trajectory on the slidable trajectory to a second trajectory according to the re-determined current touch point and displaying the second trajectory on the screen;

wherein, the first trajectory is entire or part of the slidable trajectory, the length of the second trajectory is longer than that of the first trajectory, wherein touch points on the slidable trajectory correspond to a plurality of pages to be displayed respectively, wherein, the changing the corresponding first trajectory on the slidable trajectory to the second trajectory according to the re-determined current touch point comprising:

changing the first trajectory with straight-line appearance on the slidable trajectory to the second trajectory with curved-line or folded-line appearance according to the re-determined current touch point, wherein, the changing the first trajectory with straight-line appearance on the slidable trajectory to the second trajectory with curved-line or folded-line appearance according to the re-determined current touch point comprising:
   determining parameter values of a first pre-determined function according to a location of the re-determined current touch point and a location of a first end point of the first trajectory;
determining a portion of the second trajectory between the re-determined current touch point and the first end point according to the first pre-determined function;
determining parameter values of a second pre-determined function according to the location of the re-determined current touch point and a location of a second end point of the first trajectory; and
determining an other portion of the second trajectory between the re-determined current touch point and the second end point according to the second pre-determined function;
wherein, each of the function type of the first pre-determined function and the second pre-determined function is any one chosen from the group of linear function, parabola function, n-th power function, index function and trigonometric function.

* * * * *